Patented Aug. 7, 1928.

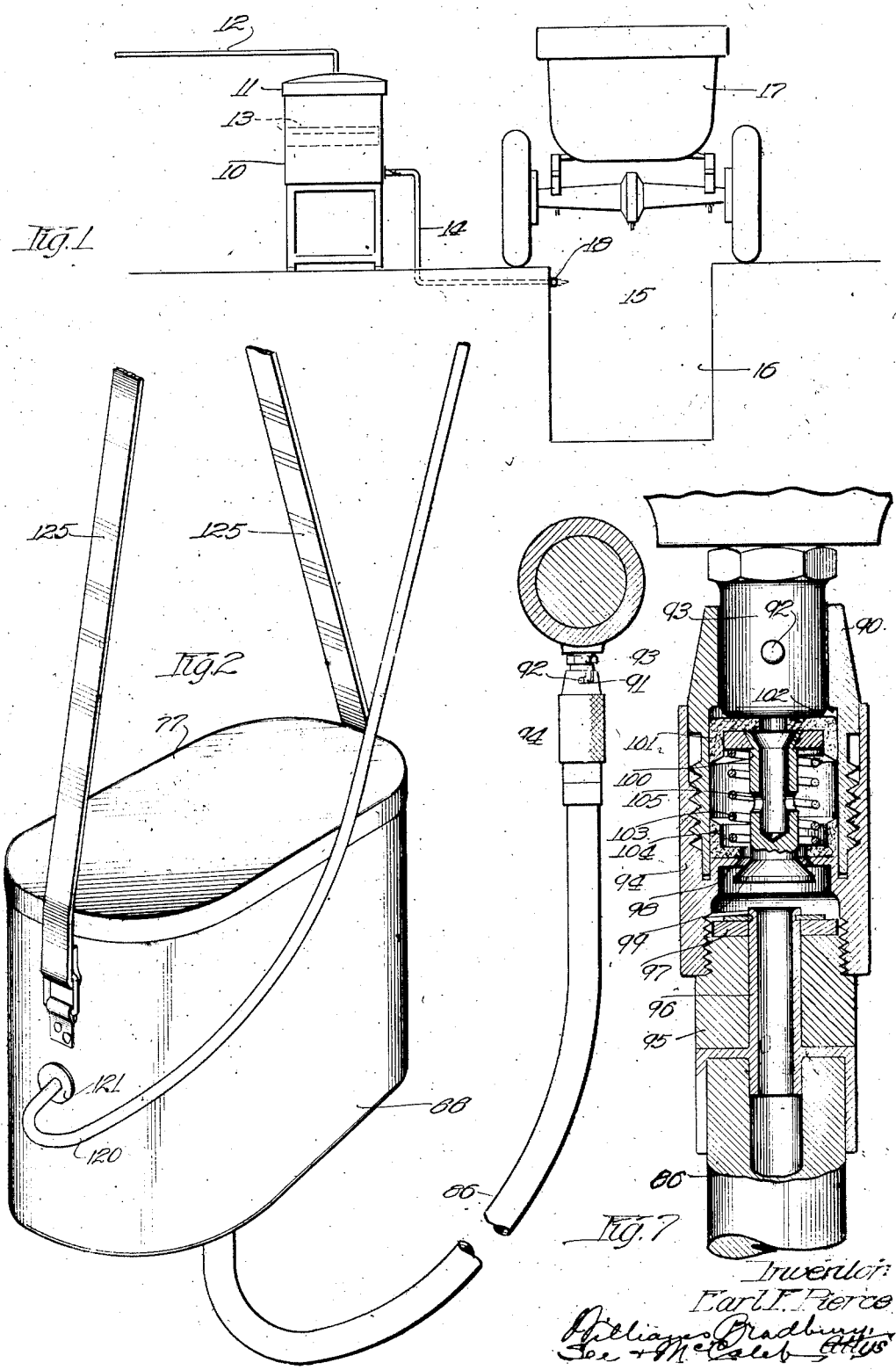

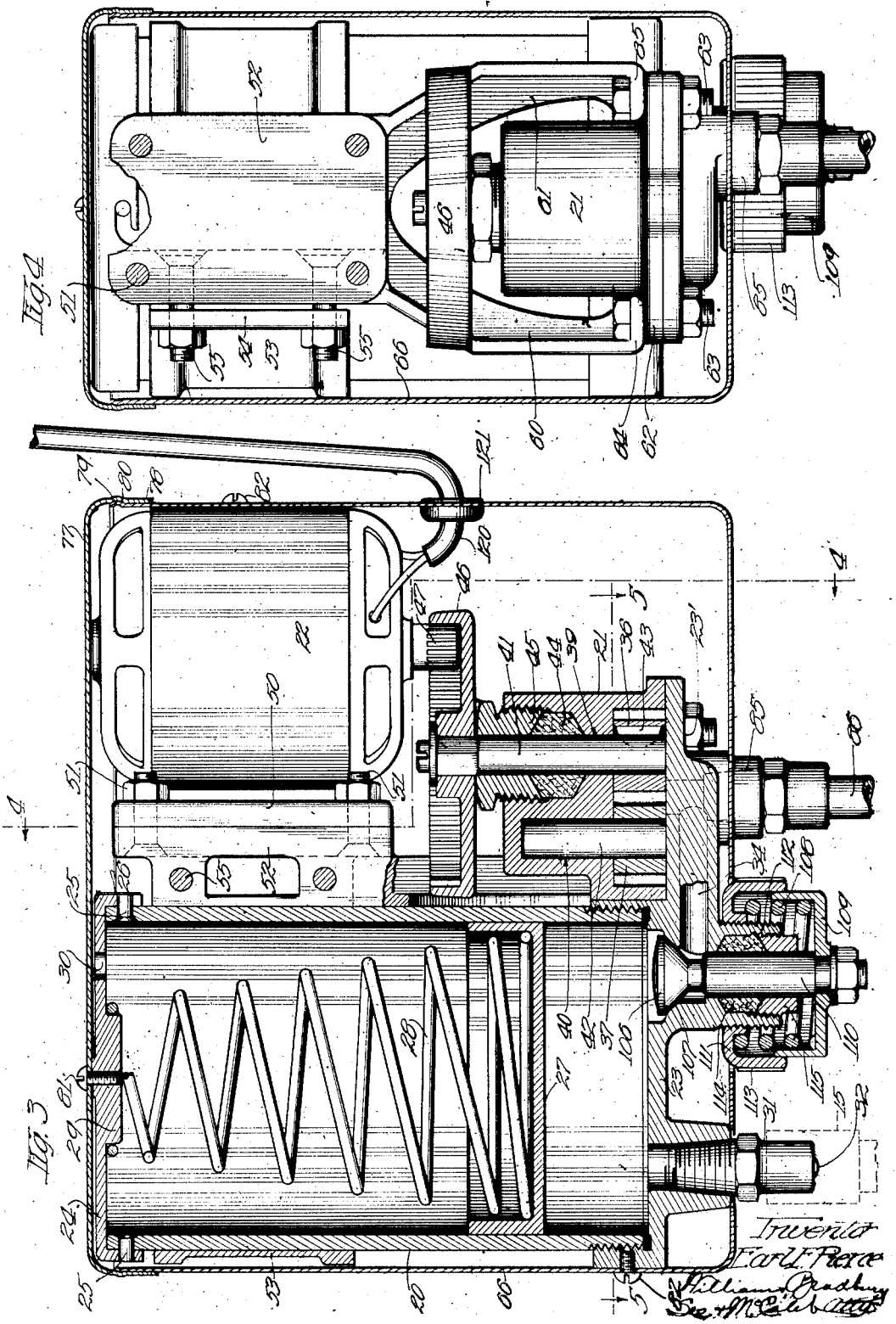

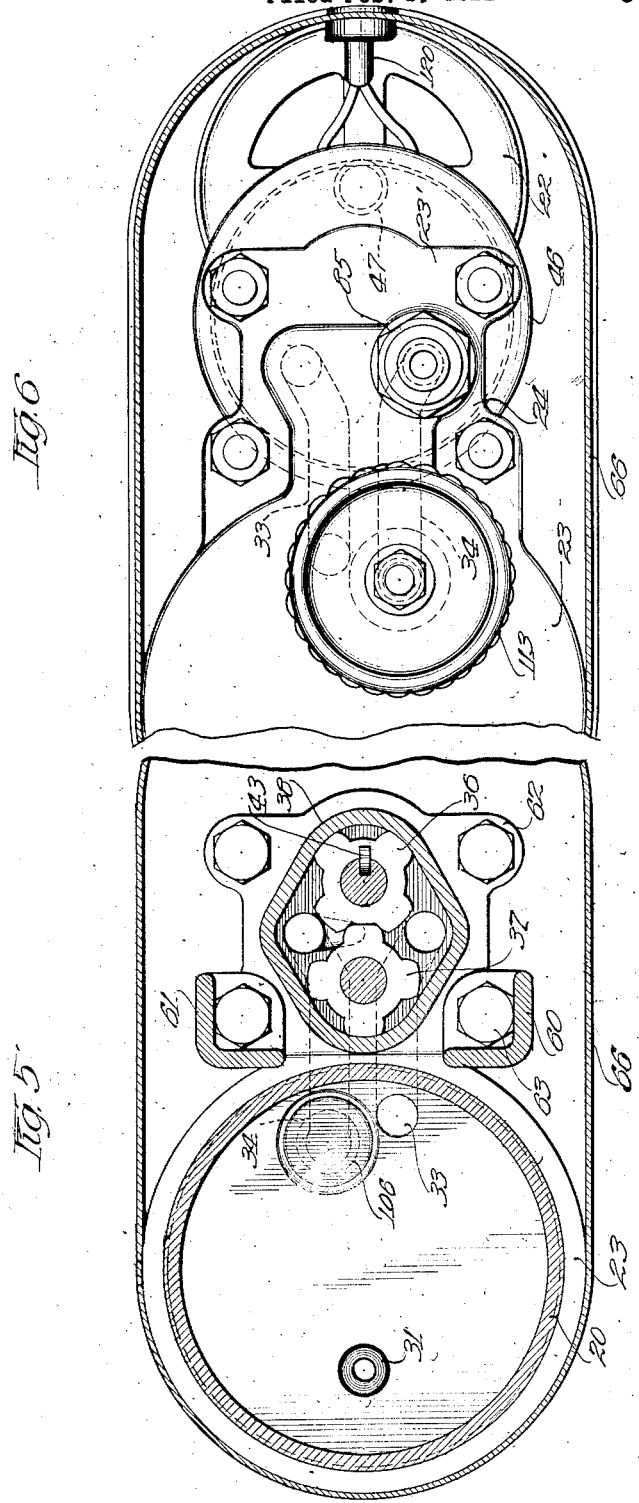

1,679,493

UNITED STATES PATENT OFFICE.

EARL F. PIERCE, OF CHICAGO, ILLINOIS, ASSIGNOR TO THE BASSICK MANUFACTURING CO., OF CHICAGO, ILLINOIS, A CORPORATION OF DELAWARE.

LUBRICATING SYSTEM.

Application filed February 2, 1921. Serial No. 441,738.

My invention relates to improvements in lubricating systems and is particularly concerned with improvements in that type of lubricating system which comprises a plurality of coupling members or nipples secured to the various bearings to be lubricated, a source of lubricant under pressure and a discharge conduit connected with the source of lubricant and provided with a coupling member for successively making detachable sealed connection with the coupling members or nipples secured to the bearings.

The objects of my invention are

First, to provide a system comprising a source or supply of lubricant under comparatively low pressure, portable means for receiving lubricant from said source under comparatively low pressure and feeding it to the bearings through a suitable discharge conduit and coupling member under higher pressure.

Second, to provide a system of the character described in which the portable means comprises a receptacle for receiving lubricant from the source of lubricant and storing a sufficient quantity of lubricant to lubricate a plurality of bearings and a motor-driven pump for delivering lubricant from said receptacle under comparatively high pressure.

Third, to provide a system of the character described in which the portable unit comprises a receptacle for receiving lubricant from the source or supply, a pump for taking lubricant from said receptacle and forcing it through the discharge conduit under comparatively high pressure, a motor for continuously driving the pump, and means for relieving the pressure on the discharge side of the pump when the coupling is manipulated to prevent any further discharge of lubricant through the discharge conduit so as not to injure the pump or motor even though the motor continues to operate.

Fourth, to provide a system of the character described in which a by-pass is provided from the discharge side of the pump back to the lubricant receptacle, the by-pass containing means for controlling the pressure of the lubricant in the discharge conduit, and Fifth, to provide a self-contained power-operated pressure device for delivering lubricant under pressure of comparatively small weight so that it can be carried about by the operator, the said means comprising a discharge conduit provided at its free end with a coupling member of such construction that it can be attached to and detached from the coupling members or nipples secured to the bearing while the lubricant in the discharge conduit is under pressure.

Other objects will appear as this description progresses, reference being had to the accompanying drawings, in which Figure 1 is a more or less diagrammatic view illustrating a portion of my improved lubricating system.

Figure 2 is a perspective view showing the exterior of the portable element of my lubricating system, the coupling member thereof being illustrated as connected with a nipple secured to a bearing shown in transverse section.

Figure 3 is a vertical central section through the portable unit, portions of the apparatus being shown in elevation.

Figure 4 is a vertical transverse section taken on line 4—4 of Figure 3.

Figure 5 is a horizontal transverse section taken on line 5—5 of Figure 3, portions of the apparatus being broken away.

Figure 6 is a bottom view of the portable element, portions of the casing being broken away, and Figure 7 is a longitudinal section through the coupling member secured to the free end of the discharge conduit of the portable unit which is illustrated as being connected with the nipple shown in elevation.

Throughout the several views, similar reference characters will be used for referring to similar parts, and the various sections are taken looking in the direction of the small arrows.

In Figure 1 I have illustrated a portion of my improved lubricating system embodied in a system for lubricating automobiles, trucks and other vehicles but it should be clearly kept in mind that my invention is not limited to this particular use. In this figure the reference character 10 indicates a container for holding a supply of lubricant, the container being provided with a suitable cover 11 which is secured to the container 10 in any suitable manner to resist the pressure of and prevent leakage of compressed air admitted to the container through the cover by the pipe 12 which is connected with any suitable supply of compressed air. Preferably the container 10 contains a plunger or follower 13 which rests upon the top of the lubricant and is forced downwardly by the air pressure. The container 10 may be provided with a suitable discharge conduit 14 which ends in a coupling member 15 in the pit 16 over which the vehicle 17 to be lubricated can be run. The valve 18 or any other suitable means may be used for controlling the flow of lubricant through the discharge conduit 14.

The portable unit of my improved lubricating system comprises a lubricant receptable 20, a pump 21, here illustrated as being of the gear pump type for receiving lubricant from the receptable 20, and a motor 22 for operating the pump, this motor preferably being an electric motor.

The receptable 20 comprises a cylindrical barrel having the end caps 23 and 24 respectively, the latter cap being detachably secured to the barrel by means of the pins 25 which operate in suitable bayonet slots formed in the flange 26 of the end cap 24. A plunger or follower 27 operates in the barrel of the receptacle 20 and is forced toward one end of the receptacle by a compression spring 28, one end of which bears against the plunger 27 and the other end of which bears against the inner side of the end cap 24. A boss 29 projecting inwardly from the cap 24 provides means for keeping the spring 28 centered relatively to the receptacle. The end cap 24 is provided with a breather opening 30.

A coupling member or nipple 31 is mounted on the end cap 23 and communicates with the interior of the receptacle on the side of the plunger opposite the spring 28. This nipple is adapted to make a detachable sealed connection with the coupling member 15 shown in Figure 1 so that the receptacle 20 can be filled by merely inserting the nipple 31 into the coupling member 15 and properly manipulating the valve 18. This means that the pressure on the lubricant in the container 10 must be sufficient to overcome the pressure of the spring 28. The nipple 31 is provided with a closure and check valve 32 which prevents the escape of lubricant from the receptacle 20 under the pressure of the spring 28.

The end cap 23 of the receptacle 20 has a lateral extensions 23' which forms one end of the gear pump 21. This extension contains two passageways 33 and 34 respectively, which establish communication between the receptacle 20 and the gear pump. The first passageway, namely 33, provides means for conducting lubricant from the receptacle 20 to the intake side of the gear pump 21 and the second passageway 34 provides a conduit from the discharge side of the gear pump to the receptacle 20. The function of this passageway will be referred to later on.

The gear pump comprises the two intermeshing gears 36 and 37 and a suitably formed housing 38, the end portion of which is provided with bearings 39 and 40 for the shafts 41 and 42 respectively upon which the gears 36 and 37 are mounted. The gear 36 is secured to the shaft by a key 43. Preferably I provide a gland 44 and a follower 45 for preventing leakage along the shaft 41. An internal gear 46 is secured to the outer end of the shaft 41 and meshes with the pinion 47 on the end of the armature shaft of the motor 22.

The base plate 50 of the motor 22 is secured by means of bolts 51 to a block 52. The block 52 is secured to the barrel of the receptacle 20 by means of a split ring 53 which is formed integrally with the block, the free end 54 of the ring being secured to the block by means of the bolts 55.

The block 52 is provided with two spaced arms or brackets 60 and 61 respectively, the outer ends of which act as supports for the gear pump 21. The housing or casing of the gear pump 21 is provided with a peripheral flange 62 against which the extension 23' of the end cap 23 is clamped by the bolts 63 carried by the inturned portions 64 and 65 of the arms 60 and 61.

It will thus be seen from the above description that the receptacle 20, the gear pump 21 and the motor 22 are rigidly connected together to form a unit. This unit is preferably enclosed in a suitable casing or housing 66 which is provided with a cover 77. Preferably the flange 78 of the cover and the adjacent portion of the casing 66 are provided with a co-acting bead 79 and groove 80 for securing the cover to the casing. A screw 81 can be used for locking the cover to the end cap of the receptable 20, if desired. Other screws 82 may be used for securing the casing to the various portions of the unit contained therein.

The gear pump is provided with a boss 85 which projects outwardly through the casing 66 and contains the discharge passageway of the gear pump. A discharge conduit 86 preferably of flexible tubing capable of withstanding considerable pressure has one end connected with the boss 85. The other end of the discharge conduit 86 is provided with a coupling member which is preferably of such construction that it can be attached to and detached from the nipples secured to the bearings without the escape of lubricant from the discharge conduit and without the necessity of relieving the pressure on the discharge conduit. The coupling member is disclosed and claimed in the copending application of E. W. Davis; consequently the details of construction of this coupling will only briefly be referred to herein as no claim is made in this application to the details of construction except as they co-act with the remaining elements of my novel combination. This coupling comprises a sleeve 90 having suitable bayonet slots 91 formed in the outer end thereof for co-acting with the pins 92 projecting from the sides of the nipples 93. The inner end of the sleeve 90 has a screw-threaded connection with the outer knurled sleeve 94, this sleeve, in turn, being connected with a plug or ring 95 which is swiveled upon the tubular member 96. The tubular member 96 is suitably secured to the end of the conduit 86. A gasket 97 seals the joint between the ring 95 and the tubular member 96. A valve seat 98 is formed integrally with the sleeve 94 and is adapted to coact with the valve 99 carried by the hollow stem 100. A gasket 101 is secured to the opposite end of the stem 100 and is urged upwardly toward the shoulder 102 of the sleeve 90 by a spring 103 which is confined between the gasket 101 and a second gasket 104 which seals the joint between the valve seat 98 and the sleeve 99. Suitable openings 105 establish communication between the interior of the sleeve 90 and the hollow valve stem 100.

From the above description it will be seen that when the sleeve 90 has been manipulated to lock it to the coupling 93, continued rotation of the sleeve 94 will cause the valve seat 98 to move away from the valve 99 thus leaving an opening through which the lubricant under pressure in the conduit 86 can be discharged into the interior of the sleeve 90 from which it flows through the openings 105 out through the hollow stem 100 and into the nipple 93 and thus to the bearing. In detaching the coupling from the nipple, the sleeve 94 is rotated to thus bring the seat 98 into sealing contact with the valve 99 and then further rotate it to detach the sleeve 90 from the nipple. In this manner the coupling member can be attached to and detached from the nipples without the necessity of relieving the pressure in the discharge conduit 86.

One of the objects of my invention is to provide a construction in which the motor 22 can operate continuously while a car or machine is being lubricated and it will, therefore, be apparent that some means must be provided for preventing injury to the motor and the pump during the periods when the coupling members is detached from the nipples and there is no opportunity for the lubricant to be discharged through the conduit 86. I do this by providing the by-pass conduit 34 referred to above which leads from the discharge side of the pump to the receptacle 20. It is, of course, obvious that if the resistance to the flow of lubricant through the passageway 34 is less than the resistance to the flow of lubricant through the discharge conduit 86, the pump would merely act to take lubricant from the receptacle through the conduit 33 and return it to the receptacle through the conduit 34 thus causing a constant circulation of lubricant from the receptacle to the pump and then back to the receptacle. To normally prevent this result, I provide the valve 106 which co-acts with the seat 107 formed in the passageway 34 to close the passageway 34. The valve 106 is yieldingly held in its closed position by means of a spring 108, one end of which abuts against the cap 109 carried by the outer end of the valve stem 110 and the other end of which is confined by an adjusting collar 111 which is in screw-threaded engagement with the externally screw-threaded portion 112 of the bushing which is formed integrally with the end cap 23. The collar 111 is provided with a flange 113 which is preferably knurled so that it can be rotated to adjust the tension of the spring 108. A suitable gasket 114 and follower 115 provide means for preventing the escape of lubricant along the valve stem 110.

From the above description, it will be clear that the tension of the spring 108 can be adjusted so that the valve 106 will open when the pressure of the lubricant in the discharge conduit has reached any predetermined degree. Thereafter, until the pressure in the discharge conduit has reduced, the lubricant will simply circulate from the receptacle 20 to and through the pump and back to the receptacle 20. The pressure of the lubricant in the discharge conduit 86 can be controlled by varying the tension of the spring 108. If no lubricant is to be discharged through the conduit 86 for a considerable period of time, the operator can, by completely relieving the tension of the spring 108 on the valve 106, permit the lubricant to circulate under substantially zero pressure thereby reducing the load on the motor and the pump. It will, of course, be clear that a suitable switch can be inserted in the circuit of the motor to start and stop it at will. The motor is supplied with current through a suitable electric conduit 120 which enters the casing 66 through an insulated bushing 121 placed at any suitable point.

While the portable unit described above may be carried about the car or machine to be lubricated in any suitable manner, I prefer to provide it with a shoulder strap 125 whereby the unit can be supported from the shoulder of the operator thus leaving both hands free to manipulate it. In using my improved apparatus, the operator fills the receptacle 20 by properly engaging the nipple 31 with the coupling member 15 and manipulating the valve 18 to permit the lubricant to flow into the receptacle 20. The spring 28 is compressed at the same time the receptacle 20 is filled, this pressure being subsequently used for discharging the lubricant from the receptacle 20 to the intake side of the pump. When the receptacle 20 is filled, the operator detaches the nipple 31 from the coupling member 15 and passes about the machine, successively attaching and detaching the coupling member at the free end of the conduit 86 with the various nipples which are to receive the lubricant.

It will, of course, be understood that the motor 22 must be in operation while the machine is being lubricated. The tension of the spring 108 should be adjusted to maintain the lowest pressure in the conduit 86 which can be used for forcing the lubricant into the particular bearings to be lubricated. If at any time a bearing is encountered which requires still higher pressures, the operator merely adjusts the tension of the spring 108 until the pressure in the conduit 86 has increased sufficiently to overcome the resistance of the bearing.

While I have described the details of the preferred embodiment of my invention, it is to be clearly understood that my invention is not to be limited to these details of construction except by the scope of the appended claims.

Having thus described my invention, what I claim is:—

1. A manually portable high pressure lubricating device for successively lubricating a plurality of bearings, comprising a continuously operable, power driven compressor, a discharge conduit therefor having means for forming a lubricant-tight connection with a bearing to be lubricated, means for relieving the pressure in said discharge conduit when a predetermined maximum pressure is reached, and manually adjustable means for determining said predetermined pressure.

2. Lubricating means comprising a continuously operable, power driven compressor, a storage chamber under resilient pressure for feeding lubricant through a tube to said compressor under initial pressure, a discharge conduit for said compressor and adapted to be connected to a part to be lubricated, and a manually adjustable by-pass around said compressor for limiting the increase in pressure developed thereby.

3. Lubricating means comprising, in combination, a source of lubricant supply, a power driven lubricant pump fed from said source of supply, a discharge conduit for said pump having manual means for effecting a connection with a part to be lubricated and for opening and closing said conduit for controlling the supply of lubricant to said part, and a spring-held by-pass valve for returning lubricant from said conduit to the intake side of said pump.

4. A manually portable high pressure lubricating device for successively lubricating a plurality of bearings, comprising a receptacle for lubricant, a discharge passage, a pump in said discharge passage, a motor connected to said pump and having means to connect it to a source of power, and means to control the pressure in said passage beyond the pump.

In witness whereof, I hereunto subscribe my name this 31st day of January, 1921.

EARL F. PIERCE.